United States Patent [19]
Donovan

[11] Patent Number: 6,155,761
[45] Date of Patent: *Dec. 5, 2000

[54] SHORT POINT ANTI-CROSS-THREADING DESIGN

[75] Inventor: Steven P. Donovan, Roscoe, Ill.

[73] Assignee: Textron Inc., Providence, R.I.

[*] Notice: This patent issued on a continued prosecution application filed under 37 CFR 1.53(d), and is subject to the twenty year patent term provisions of 35 U.S.C. 154(a)(2).

[21] Appl. No.: 09/198,792

[22] Filed: Nov. 24, 1998

[51] Int. Cl.⁷ .................................................... F16B 25/00
[52] U.S. Cl. .................................... 411/386; 411/423
[58] Field of Search ................................ 411/386, 387.4, 411/423, 411, 393, 378

[56] References Cited

U.S. PATENT DOCUMENTS

| | | |
|---|---|---|
| 1,027,782 | 5/1912 | Watrous . |
| 2,162,891 | 6/1939 | Johnson . |
| 2,531,892 | 11/1950 | Reese . |
| 2,856,617 | 10/1958 | Widmann . |
| 3,318,182 | 5/1967 | Carlson . |
| 3,352,190 | 11/1967 | Carlson . |
| 3,462,114 | 8/1969 | O'Dell, Sr. et al. . |
| 3,683,436 | 8/1972 | Reiland . |
| 3,685,328 | 8/1972 | Carpenter . |
| 4,261,402 | 4/1981 | Stanaitis . |
| 4,630,985 | 12/1986 | Simons . |
| 4,637,764 | 1/1987 | Imai . |
| 4,789,288 | 12/1988 | Peterson . |
| 4,915,560 | 4/1990 | Peterson et al. . |
| 4,971,502 | 11/1990 | Oh .......................................... 411/386 |
| 4,981,406 | 1/1991 | Weiss et al. . |
| 5,019,080 | 5/1991 | Hemer . |
| 5,064,327 | 11/1991 | Hughes . |
| 5,108,240 | 4/1992 | Liebig . |
| 5,209,622 | 5/1993 | Kazino et al. . |
| 5,234,301 | 8/1993 | Grossberndt ............................ 411/386 |
| 5,320,467 | 6/1994 | Erbes . |
| 5,419,667 | 5/1995 | Avgoustis . |
| 5,836,731 | 11/1998 | Goodwin ................................ 411/386 |

Primary Examiner—Flemming Saether
Attorney, Agent, or Firm—Trexler, Bushnell, Giangiorgi & Blackstone, Ltd.

[57] ABSTRACT

The present invention provides a novel fastener member, stud, or other threaded member, for engagement with a female member, and the method of assembly thereof. The fastener member has a novel point which facilitates engagement of the fastener member in the threaded bore, greatly reduces the possibility of cross-threading and is especially suited for use in applications involving blind holes or the use of very thin threaded holes. The fastener member has a threaded shank portion. A point is provided at the end of the shank portion and includes an unthreaded radiused portion and a threaded transition portion between the shank portion and the radiused portion. The major diameters of the threads of the transition portion gradually lessen between the opposite ends thereof. The minor diameters of the threads of the transition portion gradually lessen between the opposite ends thereof. The radiused portion can be provided with a truncated end surface.

14 Claims, 4 Drawing Sheets

SHORT POINT ANTI-CROSS-THREADING DESIGN

BACKGROUND OF THE INVENTION

This invention is generally directed to a threaded male fastener member, or other threaded member, having a novel point which facilitates engagement of the fastener member in a threaded bore of a correspondingly threaded female member and prevents the member from cross-threading upon engagement, and the method of assembly thereof. Either the member or the female member may be driven, the other member being stationary during the assembly.

During automated or manual assembly of an externally threaded fastener member with an internally threaded member, such as a nut, a tapped bore in a workpiece, or an internally threaded rivet staked to a workpiece, cross-threading can occur at assembly. Cross-threading is an unacceptable condition.

To obtain proper alignment and engagement, the external thread on the fastener member engages with the internal thread in the female member and the external thread then follows the helix path of the internal thread. The mating of the helix angle of the internal and external threads provides an inclined plane which converts input torque into clamp force in the joint.

Cross-threading occurs when a threaded member is engaged with a female member and the threads are not properly aligned when the threads on the threaded member and in the female member first engage. If the external threads on the threaded member and the internal threads in the female member are not properly aligned at the start of the threading operation, the external thread tends to cross over the crest of the internal thread which can produce deformation of the threads and binding or seizing up of the components before the desired depth of engaging is obtained. Unless the threaded member or the female member are manually realigned at this point, the external thread will wedge against the internal thread thus preventing assembly and/or damaging the threads. Cross-threading is a common occurrence in prior art fastener members, and extremely troublesome in automated assembly operations.

In an automated assembly situation, the occurrence of cross-threading can severely affect productivity. In some cases, assembly workers will have to manually engage the fastener member and the female member for a couple of threads, then apply the automated equipment to these pre-aligned fastener members.

Prior art fastener members which have attempted to prevent cross-threading within a tapped bore are provided with various designs. These prior art designs generally involve an asymmetrical point or entry end on the fastener member, with only a portion thereof on the asymmetrical end point or entry end. Examples of prior art fastener members include a "P" Point, a MAT Point, a CTP Point which is disclosed in U.S. Pat. Nos. 4,981,406 and 5,419,667, an ACT Point which is disclosed in U.S. Pat. Nos. 4,789,288 and 4,915,560, and a TRU-START which is disclosed in U.S. Pat. No. 5,064,327.

These prior art fastener members have point lengths, which is defined as the distance from the first full thread to the end of the fastener member, which are substantially longer than a standard machine screw point length. Approximate point lengths for these prior art fastener members are as follows:

MATT thread=10 pitch
GMP-Point=7.2 pitch
TRU-START, short dog point=5.6 pitch
Machine screw=2 pitch Many of the current anti-cross-threading points rely on the point length to provide alignment of the fastener member with respect to the internally threaded hole. Many of the existing machine screw applications cannot tolerate additional point length due to interference in blind tapped holes or other mating components because most applications are replacing standard machine screws. This is particularly important in small business equipment applications, such as, hard drives, cell phones, etc. Also, the additional point length adds additional weight versus a standard machine screw which can be significant in automotive applications.

Applicant's co-pending application, Ser. No. 08/916,164, filed on Aug. 21, 1997 and entitled "Fastener With Anti-Cross-Threading Point and Method of Assembly" greatly reduces the possibility of cross-threading and no-start problems. Applicant has found, however, that in some applications, such as blind holes, the point length of the fastener member disclosed in Ser. No. 08/916,164 is too long making it unsuitable for use in this applications. This present invention overcomes this problem. In addition, in the applications which involve the use of very thin threaded holes, such as in "Tinnerman" type push-on clips, the fastener member disclosed Ser. No. 08/916,164, which uses a long, bulbous point to align itself, is not suitable for use in these applications.

It is desirable to obtain proper alignment, eliminate cross-threading and to provide a fastener member which can be used in thin threaded holes. The fastener member of the present invention provides such a member. The present fastener member minimizes the problems found in the prior art by several novel improvements to prior art fastener members. The structural features of the fastener member of the present invention and manner whereby these features function to attain the improved performance discussed above will become apparent from the discussion as follows, especially with respect to the drawings.

OBJECTS AND SUMMARY OF THE INVENTION

A general object of the present invention is to provide a fastener member, stud or other threaded member, having a novel point on an end thereof which promotes alignment between the fastener member and a threaded bore, facilitates engagement of the fastener member in a threaded bore of a correspondingly threaded female member and resists cross-threading upon engagement, especially in applications involving blind holes or the use of very thin threaded holes.

An object of the present invention is to provide a fastener member which is capable of rapid engagement with a tapped bore so as to reduce the assembly installation time and to improve the ergonomics of a typical installation of a fastener member with a tapped bore, and also which provides improved performance when used with an automated assembly process or equipment.

Another object of the present invention to provide a fastener member which has a large "window of engagement" into a tapped bore by compensating for a condition where the fastener member and the tapped bore are off-angle from each other by providing a self-aligning point.

Yet another object of the present invention is to provide a fastener member having a novel point which length is minimized so as to lower material cost, reduce the weight of the fastener member and minimize interference problems with the point of the fastener member with other components.

A further object of the present invention is to provide a fastener member which lowers manufacturing cost as the fastener member threads and the point are roll threaded in one pass.

Briefly, and in accordance with the foregoing, the present invention discloses a fastener member, or other threaded member, and method of application for engagement with a female member having a threaded bore of a predetermined internal major diameter and a predetermined internal minor diameter. The female member may be, for example, a nut, a tapped bore in a workpiece or an internally threaded rivet staked to a workpiece.

The fastener member has a threaded shank portion and a point provided at the end thereof. The point includes an unthreaded radiused portion and a threaded transition portion between the shank portion and the radiused portion.

The radiused portion is defined by a spherical radius which emanates from a center point which is coincident with the centerline of the threaded shank portion and spaced a predetermined distance from the end of the fastener member. The radiused portion can be provided with a truncated end.

The threads which make up the transition portion are truncated. Preferably, the major diameters of the threads of the transition portion are defined by a spherical radius that is the same as the spherical radius which defines the radiused portion and, as such, the major diameters of the threads of the transition portion gradually lessen between the opposite ends thereof. While a spherical radius which is the same as that for the radiused portion is preferably used to attain the truncation of the thread crests, it is to be understood that the truncation may be of varying degrees and radii depending upon the application for the fastener member.

The minor diameters of the threads of the transition portion are defined by a spherical radius which may be larger than the spherical diameter of the radiused portion, and which emanates from points which are equidistantly offset from the centerline of the threaded shank portion a predetermined distance. The points are spaced the same predetermined distance away from the end of the fastener member as the center point which defines the radiused portion. As such, the minor diameters of the threads of the transition portion gradually lessen between the opposite ends thereof.

To engage the fastener member with the female member, the point is inserted into the threaded bore in the female member. Rotational movement and an end load are applied to one of the fastener member or the female member to first attain alignment and then engage the threads on the transition portion with the threads in the threaded bore in the female member; thus once proper alignment has been achieved, engagement of the threads on the shank portion is achieved. The unthreaded radiused portion of the point will engage the crests of the internal thread and will allow and promote a pivoting movement of the fastener member, so that the fastener axis and the axis of the internally threaded bore are moved into general alignment. The truncated nature of the threads on the transition portion serve to promote ans assist in attaining alignment. These truncated threads can move past the internal or female threads without engagement that would hamper movement of the fastener member to an aligned position. The truncated nature of the threads also promotes threaded engagement with the internal threads. Engagement of the threads on the transition portion complete the alignment of the fastener member with the female member. As such, co-alignment of the fastener member and the internally threaded bore is attained prior to the engagement of the threads on the shank portion with the internal thread, thus promoting proper engagement and avoiding a cross-thread condition.

In most applications, the fastener member or the externally threaded member with the novel anti-cross-threading point design will be the driven component being engaged within the internally threaded bore of a stationary workpiece. This situation is illustrated in FIGS. 3–7 and 10–14 of the drawings. It is to be understood, however, that the externally threaded member having the novel anti-cross-threading point of the present invention can be the stationary component and the internally threaded member can be the driven component.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention presents a novel point 20 for a fastener member 22 which promotes alignment with and facilitates engagement of the fastener member 22 in a threaded bore of a correspondingly threaded female member, such as a tapped bore 24 in a workpiece, in a nut 26, or in a rivet staked to a workpiece, and prevents the fastener member 22 from cross-threading upon insertion therein. The tapped bore 24 is a standard internally threaded bore which includes internal helical threads 28 having a major internal diameter 30 and a minor internal diameter 32. While a fastener member 22 is described and shown herein, it is to be understood that the novel point of the present invention can be used on a stud or any other product with threads and is not limited to a fastener member.

Figure 1:
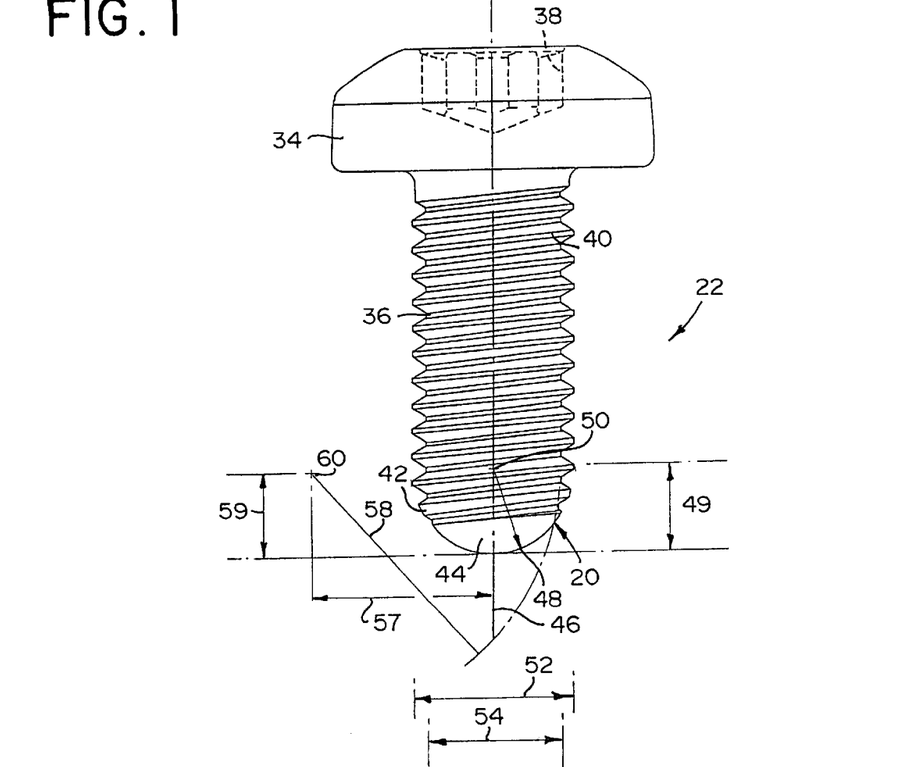
FIG. 1 is a side elevational view of a fastener member having a novel point configuration which incorporates the features of a first embodiment of the invention.
Figure 2:
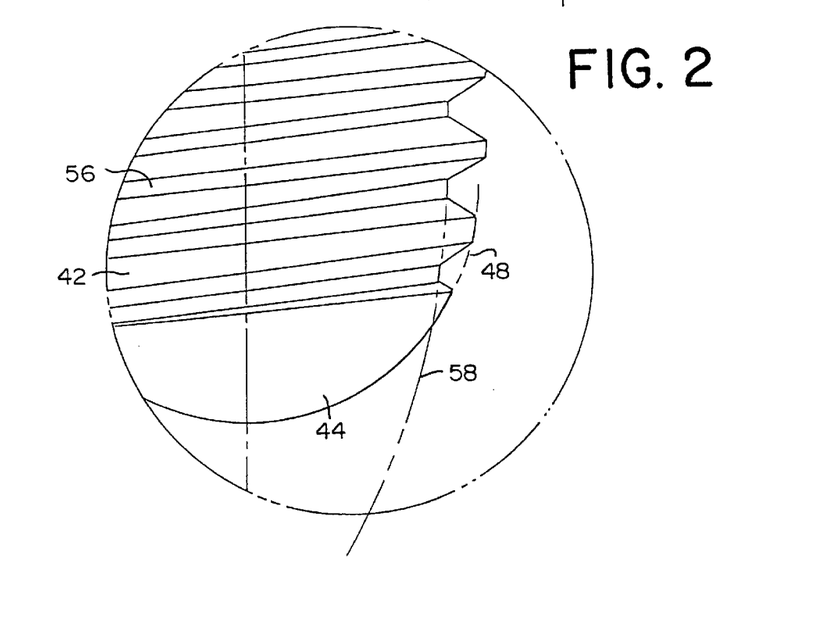
FIG. 2 is an enlarged, partial side elevational view of a portion of the point of the fastener member of FIG. 1.
Figure 8:
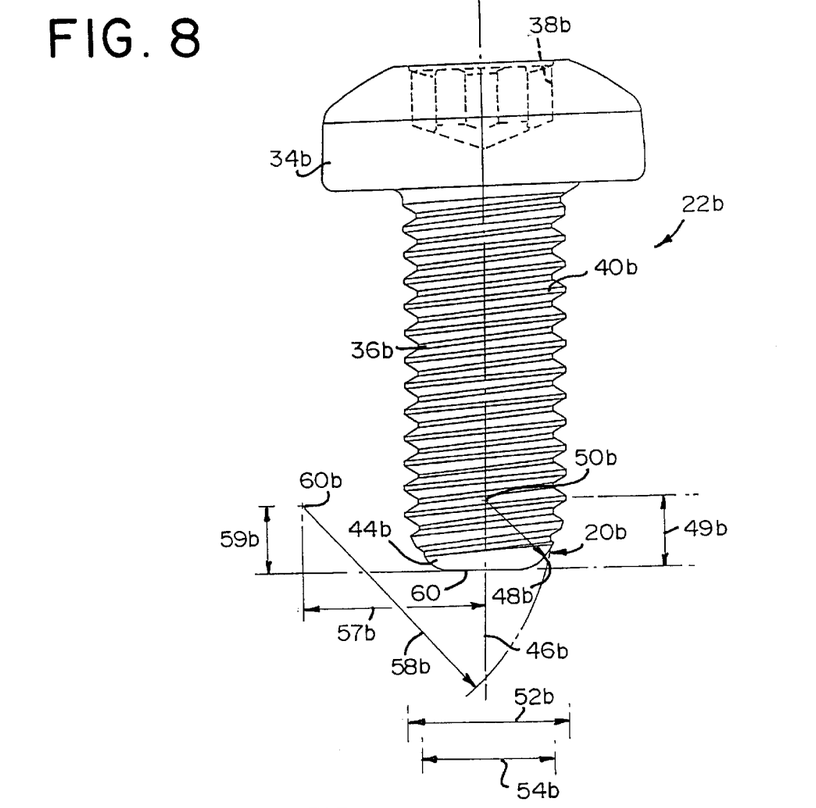
FIG. 8 is a side elevational view of a fastener member having a novel point configuration which incorporates the features of a second embodiment of the invention.
Figure 9:
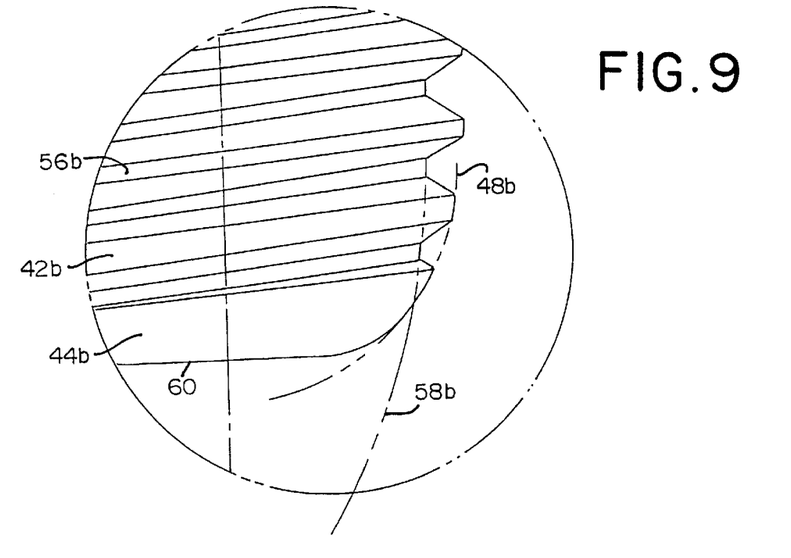
FIG. 9 is an enlarged, partial side elevational view of a portion of the point of the fastener member of FIG. 3.
Figure 10:
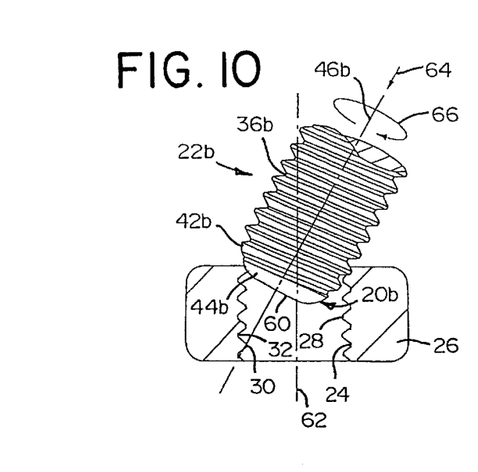
FIGS. 10–14 are side elevational views of the anti-cross-threading fastener member shown in FIGS. 8 and 9 and a cross-sectional view of a workpiece or nut in which the anti-cross-threading fastener member of the present invention is being inserted which illustrates the steps in an off-angle installation of the anti-cross-threading fastener member into a tapped bore in the workpiece or nut.
Figure 11:
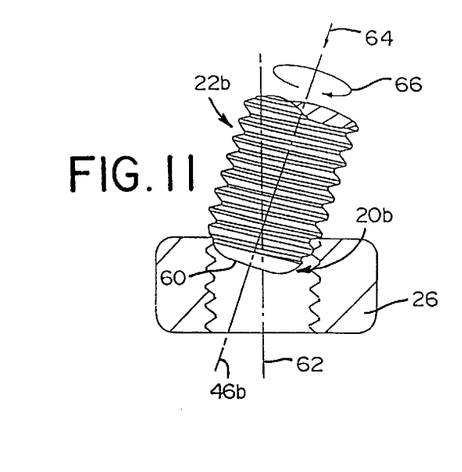
Figure 12:
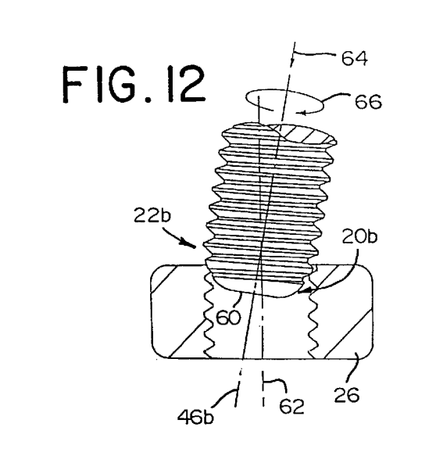
Figure 13:
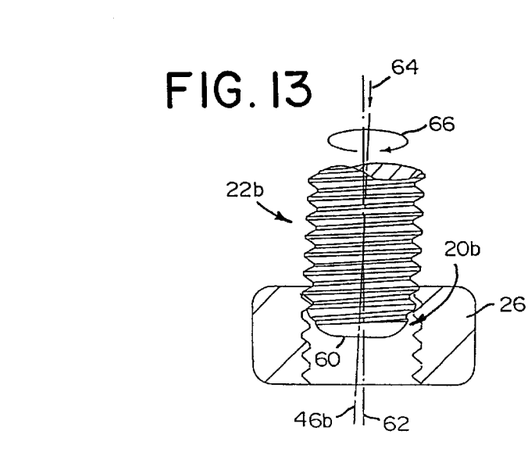
Figure 14:
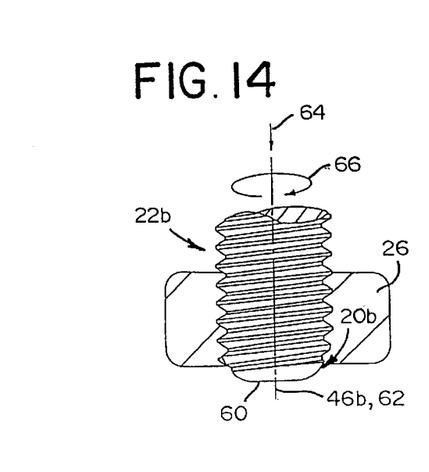

A first embodiment of the novel point 20 on the fastener member 22 is shown in FIGS. 1 and 2. A second embodiment of the novel point 20b on the fastener member 22b is shown in FIGS. 8 and 9. Like elements in each embodiment are denoted with like reference numerals with the second embodiment having the suffix "b" after the reference numeral.

The generalities of each fastener member 22, 22b is described with respect to the first embodiment of the fastener member 22. Generally, the fastener member 22 of the present invention has a head 34 with a threaded shank portion 36 extending therefrom and the novel point 20 at the end of the threaded shank portion 36. A multilobular drive recess 38, preferably a TORX PLUS® recess, is provided in the head 30. The threaded shank portion 36 has a plurality of machine screw helical threads 40 thereon. The novel point 20 is provided on the opposite end of the threaded shank portion 36 from the head 34 and includes a threaded transition portion 42 extending from the end of the threaded shank portion 36 and an unthreaded radiused portion 44 at the opposite end of the threaded transition portion 42. A centerline of the fastener member 22 is shown at 46.

The unthreaded radiused portion 44 is generally hemispherical and is defined by a predetermined spherical radius 48. The spherical radius 48 emanates from a point 50 coincident with the centerline 46 of the fastener member 22 and is spaced a predetermined distance, shown as length 49, from the end of the fastener member 22.

The threads 40 on the threaded shank portion 36 define a predetermined major external diameter 52 and a minor diameter 54. The screw threads 40 on the threaded shank portion 36 are preferably standard machine screw threads having a 60° profile.

The threads 56 on the threaded transition portion 42 are continuous with or in helical alignment with the threads 40 on the threaded shank portion 36. The transition portion 42 has first and second opposite ends and the first end is connected to one of the ends of the threaded shank portion 36. The threads 56 on the transition portion 42 transition from a full thread form at the first end thereof to a partial thread form at the second end thereof. The thread 56 at the first end of the transition portion 42 has a major surface or major diameter which is the same as the major diameter 52 of the threads 40 on the shank portion 36 and the thread at the second end of the transition portion 42 has a major surface or diameter which is the smaller than the major diameter 52 of the threads 40 on the shank portion 36, with the major diameters of the threads 56 on the transition portion 42 gradually lessening between the first and second ends thereof, see FIG. 2. The major diameters or top surfaces of the threads 56 on the transition portion 42 are defined by the spherical radius 48 that defines the radiused portion 44 of the point 20. This spherical radius shape of the major diameters of the threads 56 is formed by truncating the threads 56 along the length of the transition portion 42, see FIG. 2. That is to say, the pointed crests of the threads 56 within the transition portion 42 are removed to form the radiused profile. While a spherical radius which is the same as that for the radiused portion is preferably used to attain the truncation of the thread crests in the transition portion 42, it is to be understood that the truncation may be of varying degrees and radii depending upon the application for the fastener member 22.

The thread 56 at the first end of the transition portion 42 has a minor surface or minor diameter which is the same as the minor diameter 54 of the threads 40 on the shank portion 36 and the threads 56 at the second end of the transition portion 42 has a minor surface or minor diameter which is the smaller than the minor diameter 54 of the threads 40 on the shank portion 36, with the minor surface of minor diameters of the threads 56 on the transition portion 42 gradually lessening between the first and second ends thereof. The minor diameters of the threads 56 on the transition portion 42 are defined by a spherical radius 58 which is different, and may be larger, than the spherical radius 48 which defines the radiused portion 44 and the major diameters of the transition portion 42. The spherical radius 58 which defines the minor diameters of the threads 56 emanates from points 60 (only one of which is shown) which are equidistantly offset from the centerline 46 of the fastener member 22 a predetermined distance, shown as length 57. The points 60 are spaced the same predetermined distance, shown as length 59, away from the end of the fastener member 20 as the distance which the center point 50 is spaced from the end of the fastener member 20.

Attention is now directed to FIGS. 8 and 9 which shows the second embodiment of the fastener member 22b. The second embodiment of the fastener member 22b is identical to the first embodiment of the fastener member 22, except that the radiused portion 44b of the point 20b has a truncated end surface 60 and the points 50b, 60b are spaced a predetermined distance, shown by lengths 49b, 59b, away from the end of the truncated end surface 60. Again, the spherical radius shape of the major diameters of the threads 56b is formed by truncating the threads 56b along the length of the transition portion 42b, see FIG. 9. Again, that is to say, the pointed crest of the threads 56b within the transition portion 42b are removed to form the radiused profile.

Now that the specifics of the fastener member 22, 22b have been described, the method of inserting the fastener member 22, 22b into the stationary tapped bore 24 in the workpiece, the nut 26 or the rivet is described with regard to an off-angle condition shown in FIGS. 3–7. The engagement process is described with respect to the first embodiment of the fastener member 22 with the understanding that the method of engagement of the second embodiment of the fastener member 22b and the female member is effected in the same manner as shown in FIGS. 10–14.

The fastener member 22 self-aligns with the tapped bore 24 in the workpiece, in the nut 26 or in the rivet to correct an off-angle so as to promote alignment and prevent cross-threading of the fastener member threads 40 with the tapped bore threads 28. An off-angle installation of the fastener member 22 into the tapped bore 24 results when the centerline 46 of the fastener member 22 is at an angle to the centerline 62 of the tapped bore 24.

Figure 3:
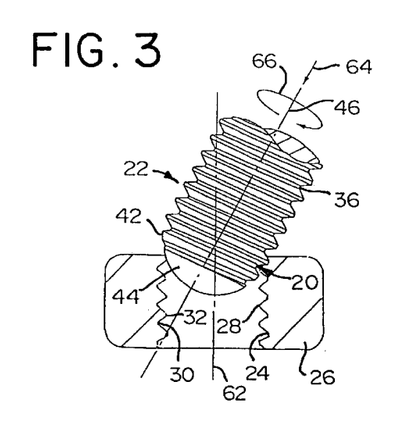
FIGS. 3–7 are side elevational views of the anti-cross-threading fastener member shown in FIGS. 1 and 2 and a cross-sectional view of a workpiece or nut in which the anti-cross-threading fastener member of the present invention is being inserted which illustrates the steps in an off-angle installation of the anti-cross-threading fastener member into a tapped bore in the workpiece or nut.
Figure 4:
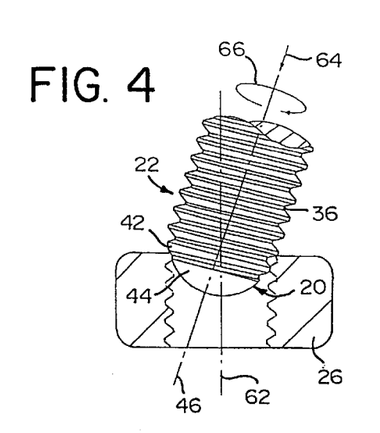
Figure 5:
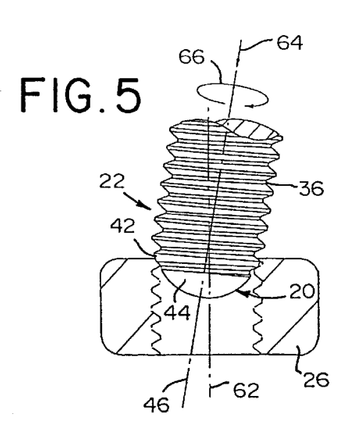
Figure 6:
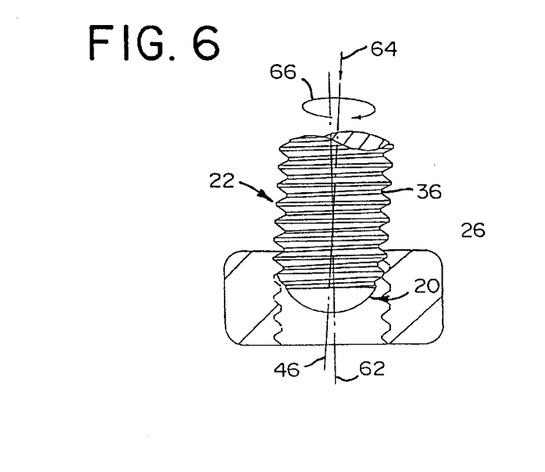
Figure 7:
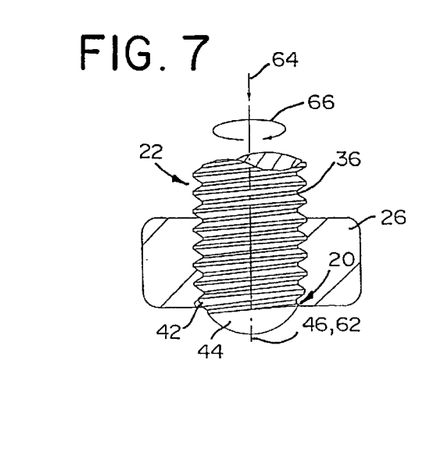

As shown in FIG. 3, the radiused portion 44 and the radiused profile threads 56 on the transition portion 42 contact the threads 28 inside the tapped bore 24. The female member 26 which has the tapped bore 24 therein remains stationary during this engagement process (unless it is being rotated and then the fastener member 22 remains stationary). The centerline 46 of the fastener member 22 begins to align, because of a moment action caused by the end load, shown by arrow 64, placed on the fastener member 22, with the centerline 62 of the tapped bore 24 by rotating or pivoting around the radiused portion 44 because of contact with the threads 28 in the tapped bore 24. More specifically, the radiused portion 44 engages the crests of the female threads 28 producing a tendency for the fastener member 22 to rock or pivot towards the aligned position, due to the application of the end load 64 and the force vector produced by the end load 64. The truncation of the threads 56 in the transition portion 42 allows the transition portion 42 to ride over or past the threads 28 and to prevent the transition portion 42 from hanging up on the threads 28.

The moment action continues to cause the point 20 to move further into the tapped bore 24. As the point 20 moves further into the tapped bore 24, the threads 56 on the transition portion 42 engage with the threads 28 in the tapped bore 24 and the centerline 46 of the fastener member 22 and the centerline 62 of the tapped bore 24 move into alignment with each other. The point 20 is disposed inside the tapped bore 24 before thread engagement between the threads 40 on the threaded shank portion 36 and the threads 28 in the tapped bore 24. Once the centerline 46 of the fastener member 22 aligns with the centerline 62 of the tapped bore 24 as a result of the transition portion 42 engagement with the threads 28 in the tapped bore 24, the fastener member 22 is driven into the tapped bore 24 by rotation shown by arrow 66 and application of the end load shown by arrow 64. Because the centerlines 46, 62 are aligned, misalignment that causes cross-threading is greatly reduced. This provides for a smooth insertion of the fastener member 22 into the tapped bore 24 which reduces the chances of a wedging action between the threads 28, 40.

When the novel point 20 is presented to the tapped bore 24 in an large off-angle condition as shown in the drawings, the internal thread 28 "sees" the point 20 as being spherical because of the truncated major diameter threads on the transition portion 42. The point 20 does not cross-thread because the crests of the threads 28 ride over the truncated major diameter threads of the transition portion 42. At a less off-angle condition, the truncated major diameter threads of the transition portion 42 establish a partial engagement with the internal threads 28 which assists in aligning the fastener member 20 with respect to the internal threads 28.

While the insertion process has been described with respect to the first embodiment of the fastener member 22, as shown in FIGS. 10–14, the second embodiment of the fastener member 22b is inserted into the tapped bore 24 in the same manner.

The length of the point 20, 20b is short versus prior art fastener members and is only slightly longer than a standard machine screw point length. The short point length allows for weight savings versus prior art fastener members. Furthermore, standard machine screws can be replaced easier because of the short point length of the present invention versus prior art points. The short point of the present invention offers savings versus prior art designs by lowering material cost and by weight reduction. In addition, this minimizes interference problems with the point 20, 20b of the fastener member 22, 22b with other components and allows for improved performance in thin nut applications. Because of the radiused portion 44, 44b and the transition portion 42, 42b, the point 20, 20b will not damage the internal thread 28 during installation unlike a straight cutoff point such as a dog point.

The fastener member 22, 22b can be economically and quickly manufactured. The fastener member 22, 22b can be rolled in one pass. The truncated thread form of the transition portion 42, 42b is incorporated into the thread rolling dies, and the blank geometry is a straight blank with an extruded short dog point. This improves productivity and lowers manufacturing costs.

The point design of the present invention can be adapted for threaded tubular products. In addition, the point design of the present invention can be adapted for tapered threads, such as NPTF pipe plugs.

While preferred embodiments of the present invention are shown and described, it is envisioned that those skilled in the art may devise various modifications of the present invention without departing from the spirit and scope of the appended claims.

The invention claimed is:

1. A member for engagement with a female member having an internally threaded bore, said member comprising: a head having means for engagement by a tool; a shank portion extending from said head, said shank portion having a plurality of threads of a consistent predetermined major diameter; and a point adapted to be engaged with the threaded bore in the female member to promote alignment of the member with the threaded bore prior to the start of engagement of the shank portion with the internally threaded bore, said point comprising an unthreaded radiused portion and a transition portion between said shank portion and said radiused portion, said transition portion having a plurality of truncated threads thereon, the truncation of said threads resulting in major surfaces of said threads in said transition portion providing a substantially spherical profile, said threads on said transition portion being continuous with the adjacent threads on said shank portion, said threads on said shank portion continuously extending from proximate to said head to said transition portion.

2. A member as defined in claim 1, wherein a thread turn at one end of said transition portion has a major diameter which is the same as said major diameter of said threads on said shank portion and a thread turn at the opposite end of said transition portion has a major diameter which is smaller than said major diameter of said threads on said shank portion.

3. A member as defined in claim 1, wherein said substantially spherical profile is defined by a spherical radius which defines said major surfaces of said threads on said transition portion which is the same as a spherical radius which defines said radiused portion.

4. A member as defined in claim 1, wherein said shank portion has threads having a predetermined minor diameter, and a thread turn at an end of said transition portion has a minor surface which is the same as said minor diameter of the threads on said shank portion and a thread turn at the opposite end of said transition portion has a minor diameter which is the smaller than said minor diameter of said threads on said shank portion.

5. A member as defined in claim 1, wherein said radiused portion has a truncated end surface.

6. A member as defined in claim 1, wherein said threads on said transition portion transitions from a full thread form at one end thereof to a partial thread form at an opposite end thereof.

7. A member for engagement with a female member having an internally threaded bore, said member comprising: a shank portion having a plurality of threads thereon, at least a portion of which has threads of a consistent predetermined major diameter, and a point adapted to be engaged with the threaded bore in the female member to promote alignment of the member with the threaded bore prior to the start of engagement of the shank portion with the internally threaded bore, said point comprising an unthreaded radiused portion and a transition portion between said shank portion and said radiused portion, said transition portion having a plurality of truncated threads thereon, the truncation of said threads resulting in major surfaces of said threads in said transition portion providing a substantially spherical profile, said threads on said transition portion being continuous with the adjacent threads on said shank portion, said threads on said transition portion having minor surfaces defined by a spherical radius.

8. A member as defined in claim 7, wherein said substantially spherical profile is defined by a spherical radius, and wherein said spherical radius which defines said minor surfaces of said threads on said transition portion is different than said spherical radius which defines said major surfaces of said threads on said transition portion.

9. A member as defined in claim 8, wherein said spherical radius which defines said minor surfaces of said threads on said transition portion is larger than said spherical radius which defines said major surfaces of said threads on said transition portion.

10. A member for engagement with a female member having an internally threaded bore, said member comprising: a shank portion having a plurality of threads thereon, at least a portion of which has threads of a consistent predetermined major diameter, said shank portion having threads having a predetermined minor diameter, and a point adapted to be engaged with the threaded bore in the female member to promote alignment of the member with the threaded bore prior to the start of engagement of the shank portion with the internally threaded bore, said point comprising an unthreaded radiused portion and a transition portion between said shank portion and said radiused portion, said transition portion having a plurality of truncated threads thereon, the truncation of said threads resulting in major surfaces of said threads in said transition portion providing a substantially spherical profile said threads on said transition portion being continuous with the adjacent threads on said shank portion, and a thread turn at an end of said transition portion having a minor surface which is the same as said minor diameter of the threads on said shank portion and a thread turn at the opposite end of said transition portion having a minor surface which is the smaller than said minor diameter of said threads on said shank portion, said threads on said transition portion having minor surfaces defined by a spherical radius.

11. A member as defined in claim 10, wherein said spherical radius which defines said minor surfaces of said threads on said transition portion is different than a spherical radius which defines said radiused portion.

12. A member as defined in claim 11, wherein said spherical radius which defines said minor surfaces of said threads on said transition portion is larger than said spherical radius which defines said radiused portion.

13. A method of engaging a member and a female member comprising the steps of: providing a member having a central axis, a head having means for engagement by a tool, a shank portion extending from said head, said shank portion having threads thereon, and a point comprising an unthreaded radiused portion and a transition portion between said shank portion and said radiused portion, said transition portion having a plurality of truncated threads thereon, the truncation of said threads resulting in major surfaces of said threads in said transition portion providing a substantially spherical profile, said threads on said shank portion continuously extending from proximate to said head to said transition portion; providing a female member having an internally threaded bore and defining an axis; engaging said point into said internally threaded bore of said female member; applying rotational movement and an end load to one or the other of said member or said female member while maintaining the other of said member or said female member stationary, to cause said point to engage the female member to promote alignment of said member axis with said female member bore axis, thereby to engage said threads on said transition portion and on said threaded shank portion with the internal threads in said threaded bore in said female member.

14. A method as defined in claim 13, wherein said member is engaged in said internally threaded bore at an off-angle condition wherein a centerline of said member is angled relative to a centerline of said threaded bore, and wherein when said threads on said transition portion are engaged with said internal threads in said female member, said centerlines are moved into alignment.

* * * * *

UNITED STATES PATENT AND TRADEMARK OFFICE
CERTIFICATE OF CORRECTION

PATENT NO. : 6,155,761
DATED : December 5, 2000
INVENTOR(S) : Steven P. Donovan

Page 1 of 1

It is certified that error appears in the above-identified patent and that said Letters Patent is hereby corrected as shown below:

Column 5,
Lines 54-55, " with the major diameters" should read -- with the major surface or major diameters --

Column 8,
Line 50, "minor diameter" should read -- minor surface --

Signed and Sealed this

Second Day of October, 2001

Attest:

*Nicholas P. Godici*

NICHOLAS P. GODICI
*Attesting Officer*    *Acting Director of the United States Patent and Trademark Office*